(12) United States Patent
Takahashi

(10) Patent No.: US 6,483,982 B1
(45) Date of Patent: Nov. 19, 2002

(54) REFLECTING-MIRROR-TYPE VARIABLE OPTICAL ATTENUATOR

(75) Inventor: Mitsuo Takahashi, Matsudo (JP)

(73) Assignee: Seikon Giken Co., Ltd., Matsudo (JP)

( * ) Notice: Subject to any disclaimer, the term of this patent is extended or adjusted under 35 U.S.C. 154(b) by 71 days.

(21) Appl. No.: 09/629,176

(22) Filed: Jul. 31, 2000

(30) Foreign Application Priority Data

Jul. 30, 1999 (JP) ............................................ 11-216668

(51) Int. Cl.$^7$ ................................................. G02B 6/26
(52) U.S. Cl. ........................... 385/140; 385/34; 385/18; 385/47; 385/25
(58) Field of Search ............................ 385/31, 33, 34, 385/39, 42, 47, 48, 50, 52, 140

(56) References Cited

U.S. PATENT DOCUMENTS

| | | | |
|---|---|---|---|
| 4,304,460 A | | 12/1981 | Tanaka et al. ............ 385/33 X |
| 4,594,504 A | | 6/1986 | Coursolle et al. ... 250/227.11 X |
| 5,226,104 A | | 7/1993 | Unterleitner et al. ....... 385/140 |
| 5,619,367 A | * | 4/1997 | Iwatsuka et al. ............ 359/283 |
| 5,745,634 A | | 4/1998 | Garrett et al. .............. 385/140 |
| 5,857,048 A | | 1/1999 | Feuer et al. .................. 385/88 |
| 5,915,063 A | * | 6/1999 | Colbourne et al. ......... 385/140 |
| 6,181,846 B1 | * | 1/2001 | Pan .............................. 385/18 |
| 6,195,479 B1 | * | 2/2001 | Pan .............................. 385/18 |
| 6,304,709 B1 | * | 10/2001 | Fujita .......................... 384/140 |

FOREIGN PATENT DOCUMENTS

WO 90/04803 5/1990 ............... 385/15 X

OTHER PUBLICATIONS

Jeff Hecht, Understanding Fiber Optics, Jun. 1999, Prentice Hall, Third Edition, pp. 295–296.*
Ford et al, "Micromechanical Fiber–Optic Attenuator XP–000786640 with $\mu s$ Response", Journal of Lightwave Technology, vol. 16, No. 9, Sep. 1998, pp. 1663–1670.

* cited by examiner

Primary Examiner—Brian Healy
Assistant Examiner—Kevin S Wood
(74) Attorney, Agent, or Firm—Venable; Gabor J. Kelemen; Chad C. Anderson

(57) ABSTRACT

A reflecting-mirror-type variable optical attenuator based on a new principle is provided. A reflecting-mirror-type variable optical attenuator according to the present invention is formed of a collimator lens with optical fibers in which two optical fibers are attached to a rod lens in respective positions off-centered from the optical axis of the rod lens and a linearly movable reflecting mirror. A phenomenon that the optical axis of a light beam emitted from one optical fiber deviates from the optical axis of the collimator lens by the angle according to the off-centered distance on the surface of the rod lens is utilized. That is, by changing the distance between the surface of the reflecting mirror arranged to be linearly movable in the optical axial direction back and forth and the surface of the rod lens, input light from one optical fiber is attenuated to be output to the other optical fiber.

10 Claims, 4 Drawing Sheets

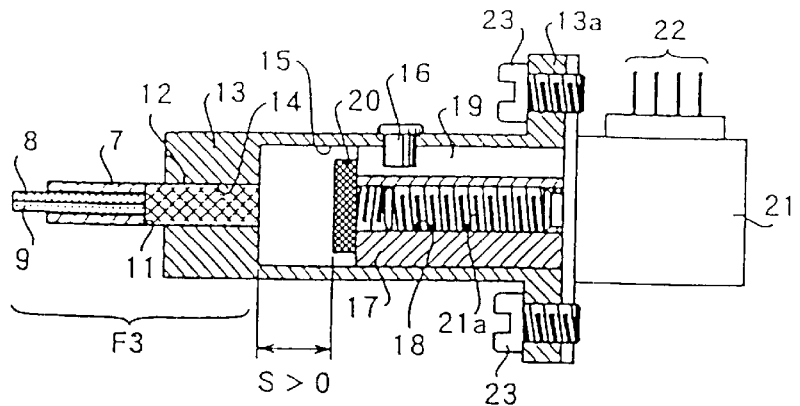
FIG. 1A
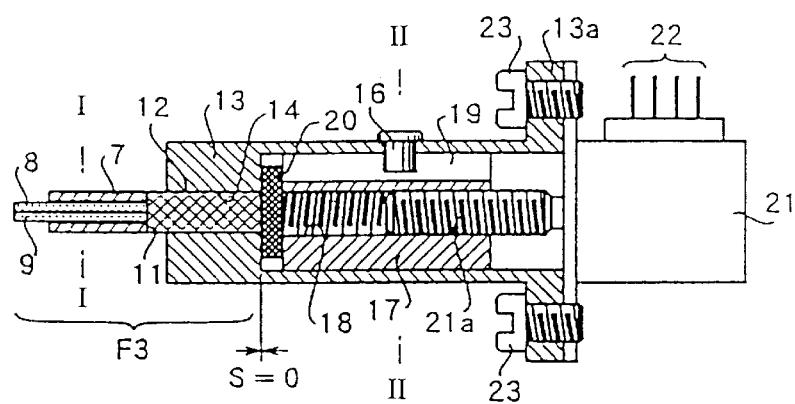
FIG. 1B
FIG. 1C
I – I SECTION
FIG. 1D
II – II SECTION

III – III SECTION

IV – IV SECTION

REFLECTING-MIRROR-TYPE VARIABLE OPTICAL ATTENUATOR

BACKGROUND OF THE INVENTION

1. Field of the Invention

The present invention relates to a variable optical attenuator. The variable optical attenuator according to the present invention is mainly for use as the DWDM system assembled in an optical fiber communication system and an optical intensity adjuster of the EDFA light amplifier and so forth. The variable optical attenuator according to the present invention is based on a new type of optical attenuation principle. By adoption of this type, extreme miniaturization for high-density mounting and improvement in resolving power of an optical attenuation and in weatherproof stability are achieved. In the variable optical attenuator according to the present invention, by adoption of this type, the structure thereof can also be simplified resulting in reduced cost in constituent parts and reduced number of assembling steps.

2. Description of the Related Art

A typical structure of widely used conventional variable optical attenuator will be described with reference to FIG. 5. A pair of assemblies "F1" and "F2" of collimator lenses with optical fibers 4, each collimator lens 4 being unitarily formed of a ferrule 2 having an optical fiber 1 attached thereto by coaxially arranging it about the same optical axis, are used by opposing these collimator lenses 4 to each other. Between the pair of collimator lenses 4 coaxially arranged with each other is inserted an attenuation filter plate 5 which is a thin glass plate having an optical attenuation film 6 formed on the surface thereof so that the thickness thereof is continuously changed.

The optical fiber 1 is inserted into the central hole 3 of the ferrule 2 to be fixed thereto. The optical fiber 1 is bonded to a rod lens 4 in coaxial alignment about the same optical axis as that of the rod lens 4 so as to produce the pair of collimator lenses with optical fibers "F1" and "F2". The collimator lenses with optical fibers "F1" and "F2" are coaxially aligned in series about the optical axes of both the collimator lenses having a gap between the faces of the rod lenses 4. The continuously-changing-type attenuation filter plate 5 is provided with the optical attenuation film 6 formed thereon. The continuously-changing-type attenuation filter plate 5 is formed so as to be movable in the direction perpendicular to the optical axis (the arrow direction) by a step motor and a movement mechanism (not shown). Corresponding to the movement, the thickness of the optical attenuation film at the optical axial position of the collimator lenses with optical fibers "F1" and "F2" is changed. Therefore, emitted light from the collimator lens with the optical fiber "F1" is continuously attenuated, as the thickness of the continuously-changing-type attenuation filter plate 5 changes, to impinge onto the collimator lens with the optical fiber "F2".

The above-mentioned conventional attenuation-filtertype motor-driven variable optical attenuator involves the following problems.

(Reproducibility of Attenuation Characteristics of the Attenuation Filter) It is extremely difficult to produce the continuously-changing-type attenuation filter having constantly equal attenuation characteristics with high stability. The manufacturing-technically inevitable dispersed errors such as unevenness in the thickness from manufacturing lot to lot of the continuously-changing-type attenuation filters are produced. Therefore, in the motor-driven filter using a step motor, the relationship between the displacement of the attenuation filter and the optical attenuation cannot be reproduced, so that smooth optical attenuating control is difficult to be performed. In addition, when a user adjusts the attenuation manually, the dispersion is not a serious problem.

(Driving Mechanism and High Accuracy in Assembling) The conventional driving mechanism shown in the drawing has an extremely simple structure formed of several parts made by precision working. However, in the attenuation filter, the driving mechanism has to be arranged to have a plane precisely orthogonal to the optical axis of the collimator lenses with optical fibers. When errors of the angle due to the accuracy in the driving mechanism are produced, errors due to the angular errors are produced. In order to prevent these errors from being produced in the structure shown in FIG. 5, the manufacturing accuracy of parts and the assembling accuracy have to be improved. That is, the cost of constituent parts is increased and numerous number of steps of assembling and adjusting are simultaneously required, resulting in expensive products.

(Restriction in Package Miniaturization) It is manufacturing-technically difficult to miniaturize the product by reducing the entire length of the continuously-changing type attenuation filter. The arrangement of the collimator lenses with optical fibers "F1" and "F2" is a structure in which the optical fibers are extended to the right and left as shown in FIGS. 1A and 1B. In this type of driving mechanism, since the attenuation filter is moved in the direction orthogonal to the optical axis of the collimator lenses with optical fibers, it is required to arrange a step motor and a driving mechanism. Therefore, the longitudinal length of the package exceeds the sum of lengths of optical fibers "F1" and "F2" of the collimator lenses with optical fibers while the width of the package is dependent on spaces for the movement of the attenuation filter and the arrangement of the related mechanisms, so that the size is increased. Accordingly, this is not suitable for a small-sized package for highdensity mounting on an optical communication system. By the way, the package dimensions of the smallest attenuation filter of this type of conventional attenuator available in the market are 50 mm in length, 25 to 45 mm in width, and 10 to 12 mm in height. In a half-inch printed circuit board package used heavily in the communication system, the height of devices to be assembled is limited to substantially 8.5 mm, so that the above-mentioned attenuator cannot be attached thereto to be used.

SUMMARY OF THE INVENTION

It is an object of the present invention to provide a reflecting-mirror-type variable optical attenuator based on a new principle so as to solve the problems of the above-mentioned conventional attenuation-filter-type motor-driven variable optical attenuator.

In order to achieve the above-mentioned object, a reflecting-mirror-type variable optical attenuator according to the present invention is formed based on a new optical attenuation principle, wherein attention is paid to the phenomenon that the optical axis of a light beam emitted from one optical fiber deviates from the optical axis of a collimator lens with optical fibers, in which two optical fibers are attached to a rod lens in symmetrical positions off-centered from the optical axis of the rod lens, by the angle according to the off-centered distance on the surface of the rod lens. That is, by changing the distance between the surface of a reflecting mirror arranged to be linearly movable in the optical axial direction back and forth and the surface of the rod lens, input light from one optical fiber is attenuated to be output to the other optical fiber.

To this end, according to one aspect of the present invention, there is provided a reflecting-mirror-type variable optical attenuator comprising a rod lens, a pair of optical fibers connected to one end face of the rod lens at end faces of the optical fibers, optical axes of the optical fibers being symmetrically arranged about the optical axis of the rod lens and in parallel to each other, and a reflecting mirror disposed in the other end face side of the rod lens linearly movable in the direction of the optical axis of the rod lens having a reflecting surface in the direction perpendicular to the optical axis thereof, wherein the quantity of light from one of the pair of optical fibers, which is reflected by the reflecting mirror via the rod lens to impinge on the other of the pair of optical fibers via the rod lens, is adjustable by positioning the reflecting mirror.

According to another aspect of the present invention, there is provided a reflecting-mirror-type variable optical attenuator comprising a mount, a rod lens supported by the mount, a pair of optical fibers, connecting means for the optical fiber pair connecting end faces of the pair of optical fibers to one end face of the rod lens so that the optical axis of each optical fiber is arranged symmetrically about the optical axis of the rod lens and in parallel to each other, and a reflecting mirror, supporting and guiding means for supporting the reflecting mirror to have a reflecting surface thereof in the direction perpendicular to the optical axis of the rod lens and to be linearly movable in the direction of the optical axis thereof, and driving means for driving the supporting and guiding means so as to adjust the quantity of light from one of the pair of optical fibers, which is reflected by the reflecting mirror via the rod lens to impinge on the other of the pair of optical fibers via the rod lens again.

The connecting means for the optical fiber pair is a ferrule in which a plurality of optical fibers are arranged in the central hole of the ferrule symmetrically about the central axis of the ferrule and in parallel thereto so as to be joined to the rod lens.

The ferrule has a central square hole in which two optical fibers are arranged symmetrically about the central axis of the ferrule and in parallel thereto.

The ferrule has two holes symmetrically about the central axis of the ferrule, in which two optical fibers are respectively arranged symmetrically about the central axis of the ferrule and in parallel thereto.

The mount is a housing member having a stepped cylindrical hole having a smaller cylindrical hole section and a larger cylindrical hole section in the axial direction, the rod lens being supported by the smaller cylindrical hole section, the supporting and guiding means for supporting the reflecting mirror being supported by the larger cylindrical hole section to be linearly movable by pin-grove connection, and a motor for driving the supporting and guiding means for supporting the reflecting mirror being fixed to the end face of the larger cylindrical hole section.

The supporting and guiding means for supporting the reflecting mirror is provided with a female thread portion, a male thread portion to be screwed with the female thread potion being driven by a motor.

The motor is a step motor and the male thread portion is disposed in the output shaft of the motor.

The reflecting mirror has a gold coating formed on a glass plate or a metallic plate by sputtering or plating.

The reflecting mirror has a gold coating formed on a glass plate or a metallic plate by sputtering or plating to yield a required attenuation. In addition to the attenuation absorbed by the reflecting mirror itself, the attenuation can be thus adjusted in accordance with position of the mirror.

The reflecting mirror has a multi-layer filter coating formed on a glass plate or a metallic plate for only reflecting light within a specific wave length range.

The rod lens has a shaft having a longitudinal pitch of 0.25.

BRIEF DESCRIPTION OF THE DRAWINGS

FIG. 1A is a side sectional view of a reflecting-mirror-type variable optical attenuator according to an embodiment of the present invention in a position yielding a large attenuation;

FIG. 1B is a side sectional view of the reflecting-mirror-type variable optical attenuator according to the embodiment of the present invention in the position yielding the minimum attenuation;

FIG. 1C is a cross-section view at the line I—I of FIG. 1B;

FIG. 1D is a cross-sectional view at the line II—II of FIG. 1B;

DESCRIPTION OF THE PREFERRED EMBODIMENTS

Figure 2A:
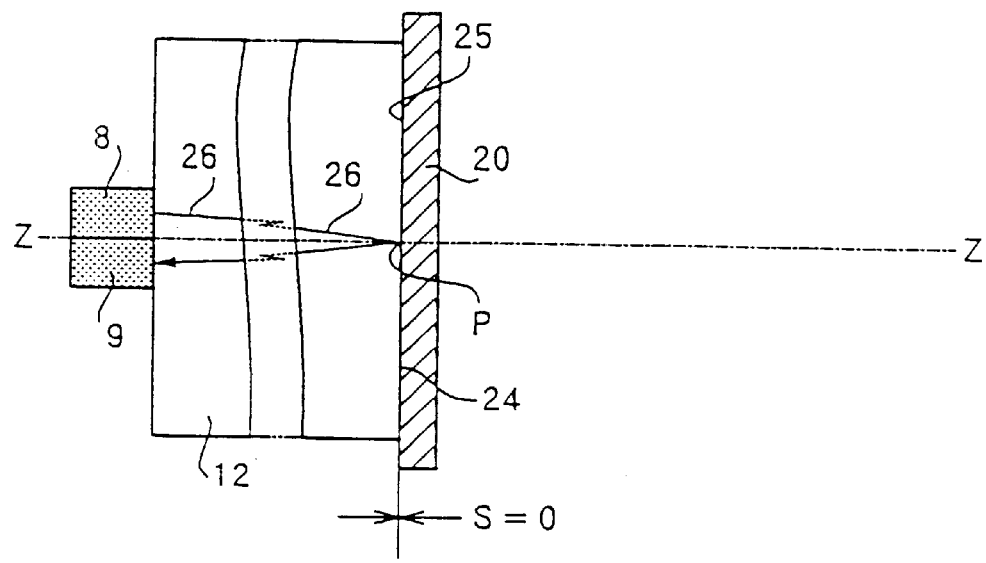
FIG. 2A is a schematic enlarged side view for illustrating operations in the position yielding the minimum attenuation in the embodiment.

An embodiment of a reflecting-mirror-type variable optical attenuator according to the present invention will be further described in detail with reference to the drawings and so forth below. FIGS. 1A and 1B are respective side sectional views of a reflecting-mirror-type variable optical attenuator according to a first embodiment of the present invention, wherein FIG. 1A shows a position of a large attenuation while FIG. 1B shows the position of the minimum attenuation. FIG. 1C is a cross-sectional view at the line I—I of FIG. 1B while FIG. 1D is a cross-sectional view at the line II—II thereof.

As shown in an enlarged view of FIG. 1C, a ferrule 7 made of glass is provided with a square hole 10 to be inserted by optical fibers 8 and 9 in the center thereof. After insertion into the square hole 10, the optical fibers 8 and 9 are simultaneously surface-ground along with the end face 11 of the ferrule. In this embodiment, the SFL (SELFOC) lens made by NIPPON SHEET GLASS Co. Ltd. is used as a rod lens 12. This rod lens 12 is a rod lens of 2 mmφ in diameter and 0.25 in longitudinal pitch. The collimator lens with the optical fiber "F3" is formed by connecting the ferrule 7 with the optical fiber to the end face of the rod lens 12. This connection is performed by adhesion using an optical adhesive while being adjusted so that the center of the ferrule 7 agrees with the optical axis of the rod lens.

A housing member 13 made of stainless steel and forming a mount is coaxially provided with a stepped through-hole comprising a smaller hole 14 and a larger hole 15. At the left end viewing the drawing, a flange portion 13a is provided. Into the central portion of the external wall of the larger hole 15, a detent pin 16 is fitted.

A cylindrical bush 17 made of stainless steel is provided with a female thread hole 18 in the center and a detent groove 19 to be engaged with the detent pin 16 on the external peripheral surface. This detent groove 19 and the detent pin 16 form a guide mechanism for linearly traveling. On one end face of the cylindrical bush 17, a reflecting mirror 20 is bonded to be fixed.

A motor 21 is a small-sized step motor of 7 mm in external diameter and 9 mm in length. The output shaft of the motor is unitarily formed with a male thread shaft 21a. The motor case is unitarily provided with electrical terminals 22. The step motor 21 is fixed to the flange portion 13a of the housing member 13 with two set screws 23.

In this embodiment, the reflecting mirror 20 is formed of a square glass plate with sides of 3 mm and thickness of 0.35 mm having a gold coating of 0.06 μm in thickness formed on the surface thereof by a sputtering method.

The reflecting-mirror-type motor-driven variable optical attenuator according to the present invention is formed of the above-mentioned parts and assembled by the following steps: first the rod lens 12 of the collimator lens with the optical fiber "F3" is inserted into the smaller hole 14 to be bonded; then the male thread 21a of the motor 21 is screwed in the female thread hole 18 of the cylindrical bush 17 having the reflecting mirror 20 attached thereto to be one-pierce in advance; the detent pin 16 is inserted in the detent groove 19; and the motor 21 is fitted to the housing member 13 with two set screw 23 to be fixed, so that the assembling is completed. In addition, the design specifications of the motor 21 used in the embodiment are 2.5 V in service voltage and 150 in rotational angle per one pulse while those of the male thread shaft are 2 in module (M) and 0.25 mm in pitch (P).

Figure 2B:
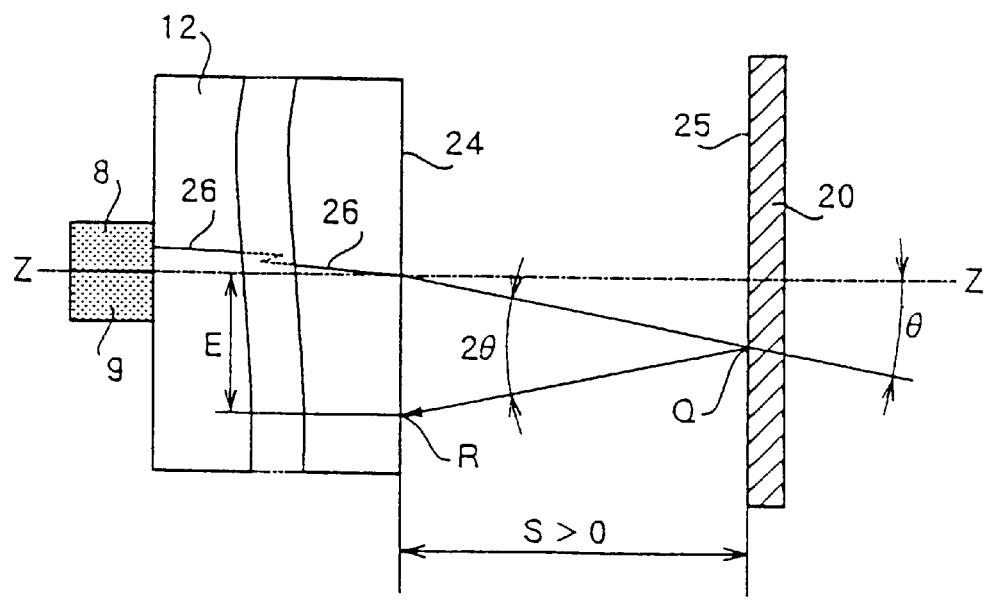
FIG. 2B is a schematic enlarged side view for illustrating operations in the position yielding a large attenuation in the embodiment.

FIGS. 2A and 2B are schematic enlarged side views for illustrating operations in the embodiment. FIG. 2A shows a state of bringing the reflecting surface 25 of the reflecting mirror 20 in close contact to the end face 24 of the rod lens 12. In this state, emitted light from the optical fiber 8 is reflected at the point "P" on the optical axial line Z—Z to impinge upon the optical fiber 9 symmetrically arranged about the optical axis, so that the optical attenuation is the minimum. FIG. 2B shows a state of separating the reflecting surface 25 of the reflecting mirror 20 from the end face 24 of the rod lens 12 by the distance "S". In this state, emitted light from the optical fiber 8 is emitted from the point "P" of the rod lens 12 on the optical axial line Z—Z into the air. At this time, the central optical axis of this emitted light 26 from the rod lens 12 is refracted due to the refractive index difference between the rod lens 12 and the air by the angle "θ" from the optical axis Z—Z of the rod lens 12. Therefore, it impinges on the off-centered reflecting point "Q" on the reflecting surface 25 of the reflecting mirror 20 eccentrically in proportion to the distance "S" between the end face 24 of the rod lens 12 and the reflecting surface 25 of the reflecting mirror 20. Since the angle reflecting from the reflecting surface 25 of the reflecting mirror 20 is "2θ" about the optical axis Z—Z of the rod lens 12, the reflected light 26 impinges on the point "R" on the end face 24 of the rod lens 12, which is off-centered by the distance "E".

The relationship between the off-centered distance "E" and the attenuation "A" can be calculated by the following equation:

$$A(dB)=4.343(E/\omega)^2,$$

wherein "ω" is the mode field radius of the rod lens.

Figure 3:
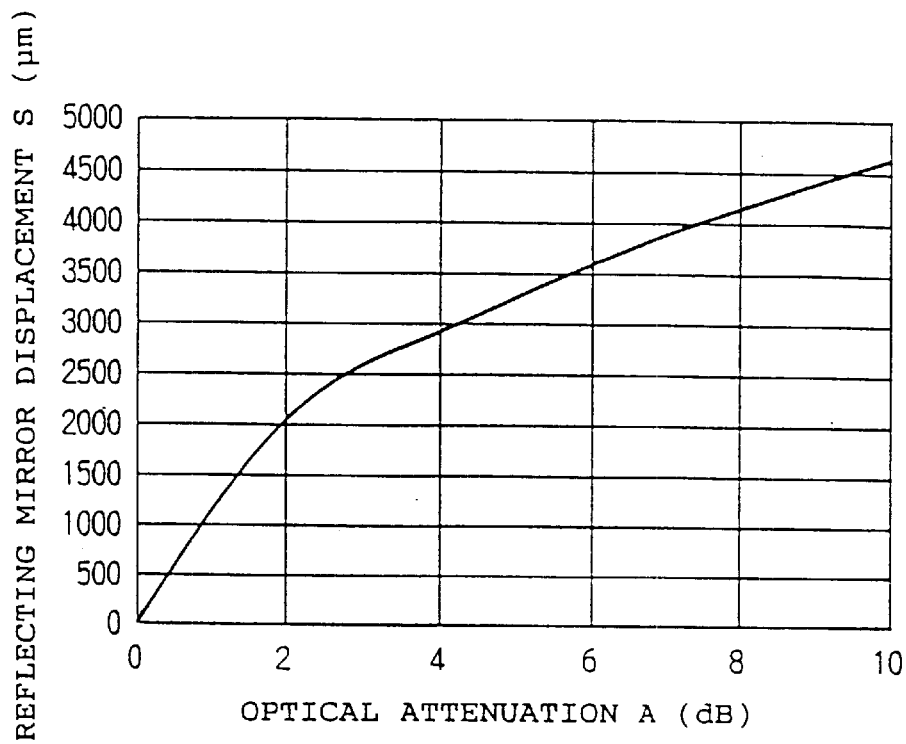
FIG. 3 is a graph showing attenuation characteristics in the embodiment.
Figure 5:
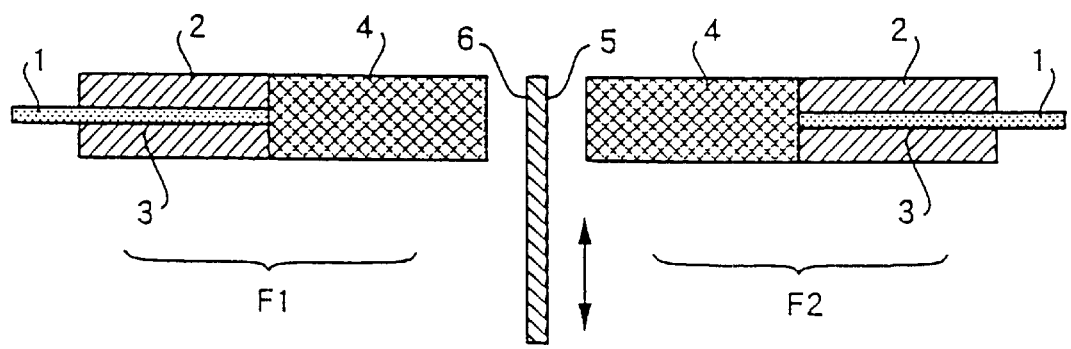
FIG. 5 is a schematic illustration for showing operations of a typical conventional variable optical attenuator.

FIG. 3 is a graph showing the relationship between the optical attenuation of a reflecting-mirror-type variable optical attenuator according to the embodiment of the present invention and the distance between the end face of the rod lens and the reflecting mirror. FIG. 3 is a graph of the relationship between the optical attenuation in the embodiment according to the present invention and the distance "S" from the end face 24 of the rod lens 12 to the reflecting mirror 25, which is obtained by calculations.

The measured values are approximately 1.5° in the emitting angle "θ" from the end face of the rod lens 12 used in the embodiment and approximately 160 μm in the mode field radius thereof. In this case, the off-centered distance "E" can be calculated by the following equation:

$$E=2S \tan 1.5=0.0524S.$$

Then the optical attenuation "A" can be calculated by the following equation:

$$A(dB)=4.343(0.0524/160)S^2=0.000000465S^2.$$

In the reflecting-mirror-type variable optical attenuator according to the present invention, when the optical attenuation is 10 dB, the required displacement distance "S" of the reflecting mirror is understood to be 4637 μm from FIG. 3, so that the required number of pulses to drive the step motor when the optical attenuation is 10 dB is to be 445.152 pulses, only having the maximum pulse error of 0.152 pulses (=the rotational angle =2.28°). In this case, the displacement of the reflecting mirror has a small error of 1.58 μm, so that the attenuation error is substantially negligible small.

The features of the reflecting-mirror-type variable optical attenuator according to the present invention described above may be summarized as follows:

1) As a driving mechanism for the reflecting mirror 20 in the above-mentioned structure, the external peripheral surface of the cylindrical bush 17 having the reflecting mirror 20 attached thereto is precisely fitted into the larger hole 15 provided in the housing member 13 to have a gap of 5 μm therebetween; then the detent pin 16 and the groove of the cylindrical bush 17 are connected together for linear traveling, so that the reflecting mirror 20 can be driven to move linearly back and forth without rotating in the circumferential direction while keeping a surface precisely perpendicular to the optical axis of the rod lens 12. This structure is a simple one wherein high degrees of accuracies in machining and assembling can be achieved.

2) In order to prevent the snaking (angular fluctuations) of the reflecting mirror 20, the cylindrical bush 17 is precisely fitted into the larger hole 15 provided in the housing member 13 to have a gap of 5 μm therebetween. When the effective length of the external peripheral surface of the cylindrical bush 17 is 8 mm, the maximum snaking angle of the cylindrical bush 17 is approximately 0.000011°. In this state, a variation in attenuation due to the snaking is calculated to be approximately 0.009 dB, which is substantially negligible small.

3) According to the present invention, the collimator lens with optical fibers, the cylindrical bush with the reflecting mirror, and the step motor are coaxially arranged and furthermore two optical fibers are arranged so as to be extended in the same direction. As described above, when a single mode optical fiber is used to have values of attenuation in the range of 0 to 10 dB, for example, dimensions of the required package can be 18 mm in width, 30 mm in length, and 8.5 mm in height. Thereby, extensive miniaturizing is achieved in comparison with the conventional smallest motor-driven variable optical attenuator.

4) Since the required displacement of the reflecting mirror relative to the change in the optical attenuation can be increased, a high degree of resolving power is obtained so that the optical attenuation can be precisely adjusted. This means to reduce changes in the optical attenuation relative to environmental changes such as changes by temperature due to the thermal expansion difference of structural parts, changes in the optical attenuation by mechanical factors such as vibrations and impacts, changes in the optical attenuation by manufacturing inaccuracy of the driving mechanism and so forth. That is, the attenuation is difficult to be affected by these factors, thereby readily obtaining excellent stability and reliability.

5) The optical attenuation can be changed in proportion to the required displacement of the reflecting mirror, resulting in smooth control of the optical attenuation.

Figure 4A:
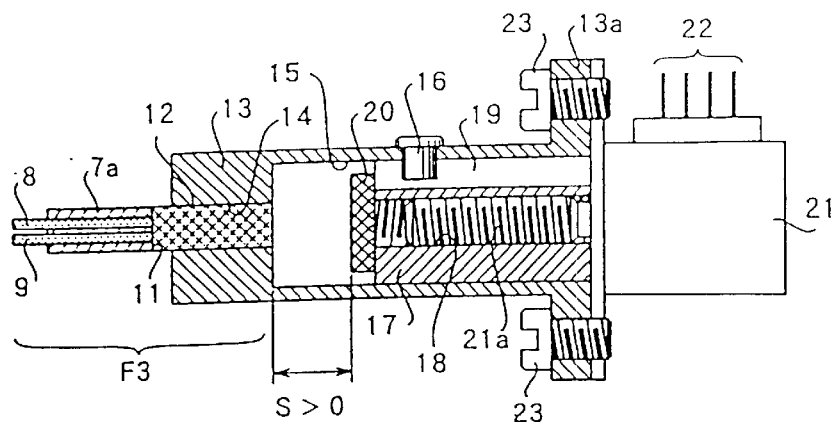
FIG. 4A is a side sectional view of a reflecting-mirror-type variable optical attenuator according to another embodiment of the present invention in a position yielding a large attenuation.
Figure 4B:
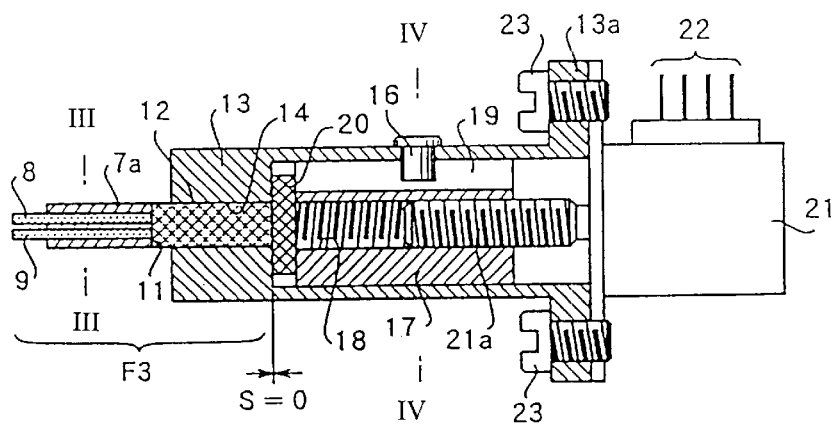
FIG. 4B is a side sectional view of the reflecting-mirror-type variable optical attenuator according to the other embodiment of the present invention in the position yielding the minimum attenuation.
Figure 4C:
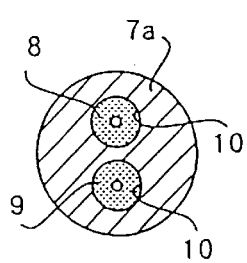
FIG. 4C is a cross-sectional view at the line III—III of FIG. 4B.
Figure 4D:
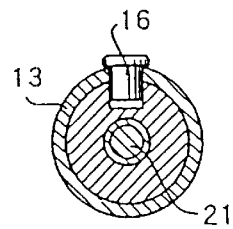
FIG. 4D is a cross-sectional view at the line IV—IV of FIG. 4B.

Another embodiment in which the ferrule in the above-mentioned embodiment is modified will be described. FIGS. 4A and 4B are side sectional views of a reflecting-mirror-type variable optical attenuator according to a second embodiment of the present invention, wherein FIG. 4A shows a position yielding a large attenuation while FIG. 4B shows the position yielding the minimum attenuation. FIG. 4C is a cross-sectional view at the line III—III of FIG. 4B while FIG. 4D is that at the line IV—IV thereof. A ferrule 7a is provided with two holes into which optical fibers 8 and 9 are respectively inserted to be fixed thereto. The surfaces of the end faces of the optical fibers and the ferrule are ground. The distance between cores of optical fibers can be increased. The operational principle is the same as that of the first embodiment. The length of the rod lens may be rather small so that the image of the end face of the optical fiber may be formed on the outlet of the rod lens.

In the reflecting-mirror-type variable optical attenuator according to the present invention, the embodiments described above in detail can be modified in various ways:

1) The reflecting-mirror-type motor-driven variable optical attenuator has been described; however a reflecting-mirror-type hand-operated variable optical attenuator may be formed by removing the step motor to assemble a screw rod instead.

2) When the required range of the optical attenuation is limited to, for example 10 to 20 dB, the changing range of the optical attenuation is to be 10 dB by using a reflecting mirror having an optical attenuation of 10 dB, so that the attenuator can be miniaturized without increasing the displacement of the reflecting mirror in the optical axial direction.

3) By using a reflecting mirror having multi-layer filter coating formed on a glass plate, which only reflects light within a specific wave length range, light within a specific wave length range can be selectively attenuated.

As described above in detail, the reflecting-mirror-type variable optical attenuator according to the present invention is formed based on a new optical attenuation principle. That is, the attenuator is formed of the collimator lens with optical fibers unitarily formed by fixing the ferrule having two optical fibers attached thereto in parallel to each other to one end face of the rod lens coaxially about the same optical axis, and the reflecting mirror arranged to be linearly movable in the optical axial direction back and forth in the state of keeping the parallel relationship to the rod lens surface. By changing the distance between the rod lens surface and the reflecting mirror, emitted light from one optical fiber is attenuated to impinge onto the other optical fiber. Therefore, effects thereof can be summarized as follows:

1) Owing to the driving mechanism in that the cylindrical bush having the reflecting mirror attached thereto is precisely fitted into the cylindrical hole, high degrees of manufacturing accuracy and assembling accuracy can be automatically achieved without skilled labor in a simple structure. Furthermore, changes in the attenuation due to the snaking (angular fluctuations) of the reflecting mirror can be minimized to be negligible small.

2) The collimator lens with optical fibers, the cylindrical bush with the reflecting mirror, and the step motor are coaxially arranged and furthermore two optical fibers are arranged so as to be extended in the same direction, so that extensive miniaturizing is achieved in comparison with the conventional smallest motor-driven variable optical attenuator.

3) Since the required displacement of the reflecting mirror relative to the optical attenuation can be extremely increased, the high degree of resolving power can be achieved enabling the optical attenuation to be precisely adjusted. Simultaneously, the attenuation is difficult to be affected by environmental changes such as changes in temperature, mechanical factors such as vibrations and impacts, and manufacturing inaccuracy of the driving mechanism, etc., resulting in excellent stability and reliability.

4) The optical attenuation can be changed in proportion to the required displacement of the reflecting mirror, resulting in smooth control of the optical attenuation.

What is claimed is:

1. A reflecting-mirror-type variable optical attenuator comprising:

a mount being a housing member having a stepped cylindrical hole having a smaller cylindrical hole section and a larger cylindrical hole section, the larger cylindrical hole section having an end face;

a rod lens being supported by the smaller cylindrical hole section and having an optical axis;

a pair of optical fibers, each having at least one end face and an optical axis;

connecting means for the optical fiber pair connecting the end faces of said pair of optical fibers to one end face of said rod lens so that the optical axis of each optical fiber is arranged symmetrically about the optical axis of said rod lens and parallel to each other;

a reflecting mirror;

supporting and guiding means for supporting said reflecting mirror in the larger cylindrical hole section to be linearly movable with a pin-grove connection; and driving means for driving said supporting and guiding means so as to adjust the quantity of light from one of said pair of optical fibers, which is reflected by said reflecting mirror via said rod lens to impinge on the other of said pair of optical fibers via said rod lens, said driving means including a motor being fixed to the end face of the larger cylindrical hole section.

2. A reflecting-mirror-type variable optical attenuator according to claim 1, wherein said connecting means for the optical fiber pair is a ferrule having at least one central hole in which a plurality of optical fibers are arranged symmetrically about the central axis of the ferrule and in parallel thereto so as to be joined to said rod lens.

3. A reflecting-mirror-type variable optical attenuator according to claim 2, wherein the at least one central hole is a central square hole in which two optical fibers are arranged symmetrically about the central axis of the ferrule and in parallel thereto.

4. A reflecting-mirror-type variable optical attenuator according to claim 2, wherein the at least one central hole includes two holes symmetrically about the central axis of the ferrule, in which two optical fibers are respectively arranged symmetrically about the central axis of the ferrule and in parallel thereto.

5. A reflecting-mirror-type variable optical attenuator according to claim 1, wherein said supporting and guiding means for supporting said reflecting mirror is provided with a female thread potion, the attenuator further comprising a male thread portion to be screwed with the female thread potion and driven by the motor.

6. A reflecting-mirror-type variable optical attenuator according to claim 5, wherein the motor is a step motor with an output shaft and the male thread portion is disposed on the output shaft of the motor.

7. A reflecting-mirror-type variable optical attenuator according to claim wherein said reflecting mirror has a gold coating formed on a glass plate or a metallic plate by sputtering or plating.

8. A reflecting-mirror-type variable optical attenuator according to claim 1, wherein said reflecting mirror has a gold coating formed on a glass plate or a metallic plate by sputtering or plating to yield a required attenuation.

9. A reflecting-mirror-type variable optical attenuator according to claim 1, wherein said reflecting mirror has a multi-layer filter coating formed on a glass plate or a metallic plate for only reflecting light within a specific wave length range.

10. A reflecting-mirror-type variable optical attenuator according to claim 1, wherein said rod lens has a shaft having a longitudinal pitch of 0.25.

* * * * *